United States Patent
Schulz et al.

(10) Patent No.: US 6,608,890 B1
(45) Date of Patent: Aug. 19, 2003

(54) SYSTEM AND METHOD FOR REMOTE UPDATING OF A TELEPHONE NUMBER TRANSFORMATION DEFINITION

(75) Inventors: Egon Schulz, München (DE); Vincenzo Scotto Di Carlo, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/333,320

(22) Filed: Jun. 15, 1999

(30) Foreign Application Priority Data

Jun. 15, 1998 (DE) .......................... 198 26 581

(51) Int. Cl.⁷ .......................... H04M 3/42; H04M 15/00
(52) U.S. Cl. .................. 379/201.05; 379/114.02
(58) Field of Search ................. 379/201.01–201.05, 379/211.01, 211.02, 221.01, 221.13, 114.02, 114.05, 114.06

(56) References Cited

U.S. PATENT DOCUMENTS

| | | | |
|---|---|---|---|
| 4,313,035 A | * 1/1982 | Jordan et al. | 340/7.58 |
| 4,893,329 A | 1/1990 | O'Brien | |
| 5,329,578 A | * 7/1994 | Brennan et al. | 379/196 |
| 5,425,085 A | * 6/1995 | Weinberger et al. | 379/114.02 |
| 5,519,769 A | * 5/1996 | Weinberger et al. | 379/114.02 |
| 5,737,400 A | 4/1998 | Bagchi et al. | |
| 5,802,160 A | * 9/1998 | Kugell et al. | 370/261 |

FOREIGN PATENT DOCUMENTS

| | | |
|---|---|---|
| AU | 34289/95 | 5/1996 |
| EP | 0 676 888 A1 | 10/1995 |
| EP | 0 844 780 A1 | 5/1998 |
| GB | 2 315 191 A | 1/1998 |
| WO | WO 92/11725 | 7/1992 |
| WO | WO 97/05749 | 2/1997 |
| WO | WO 98/21900 | 5/1998 |

OTHER PUBLICATIONS

"Information TELEFET TarifManager", http://www.ico.de/tjtm.htm, May 26, 1998.

* cited by examiner

Primary Examiner—Benny Q. Tieu
(74) Attorney, Agent, or Firm—Laurence A. Greenberg; Werner H. Stemer; Ralph E. Locher

(57) ABSTRACT

A system and a method are described for updating routing presets for a customer. The network access numbers entered in the equipment of the customer are selected by a service provider on the basis of a requirement profile of the customer, which may include both data aspects and costs aspects, and are transmitted to a transformation device using a defined communication protocol. The advantages for the customer are that it, so to speak, always dials the required network independently of the entered number, and no specific costs are incurred by the customer.

5 Claims, 4 Drawing Sheets

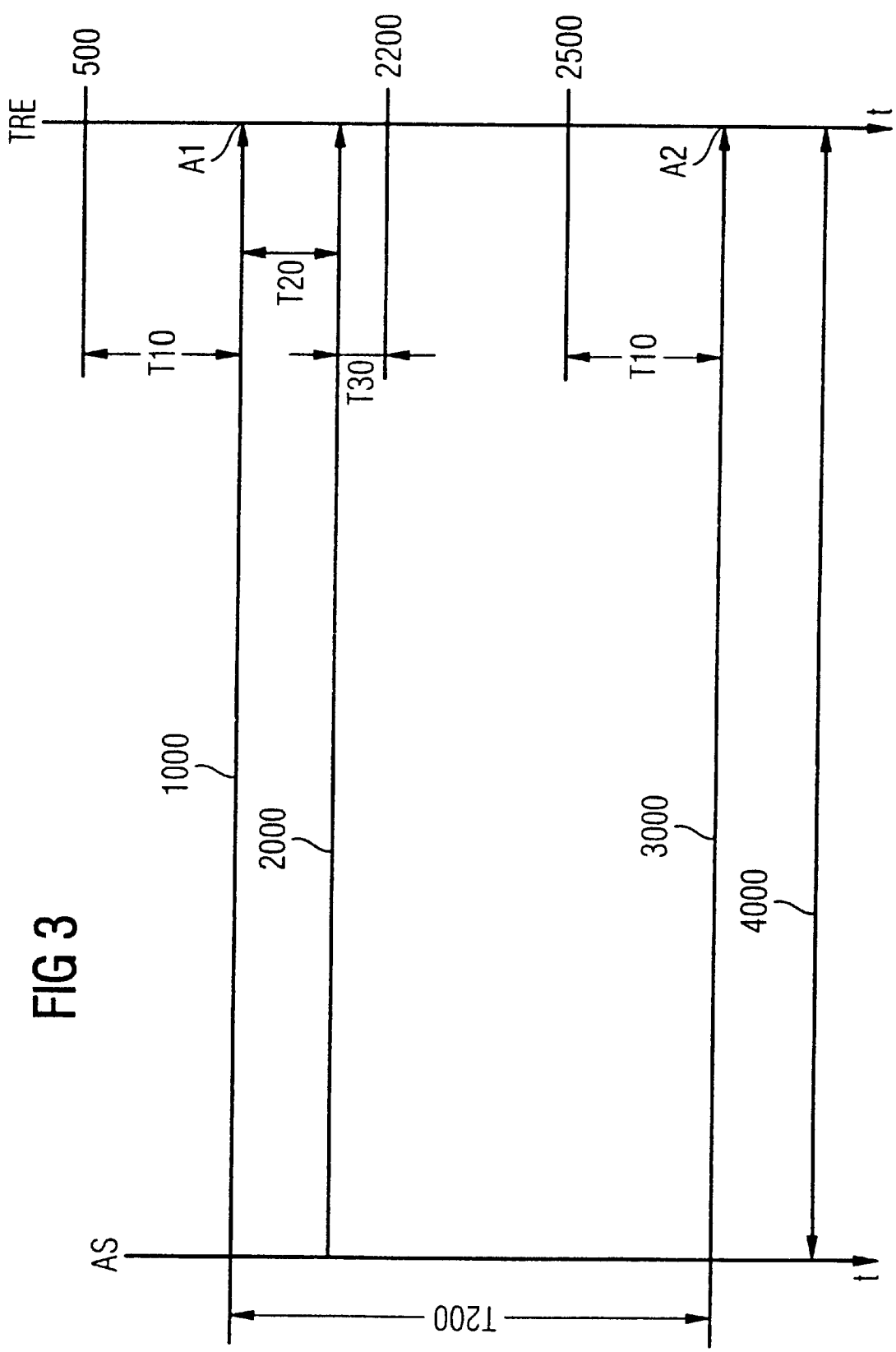

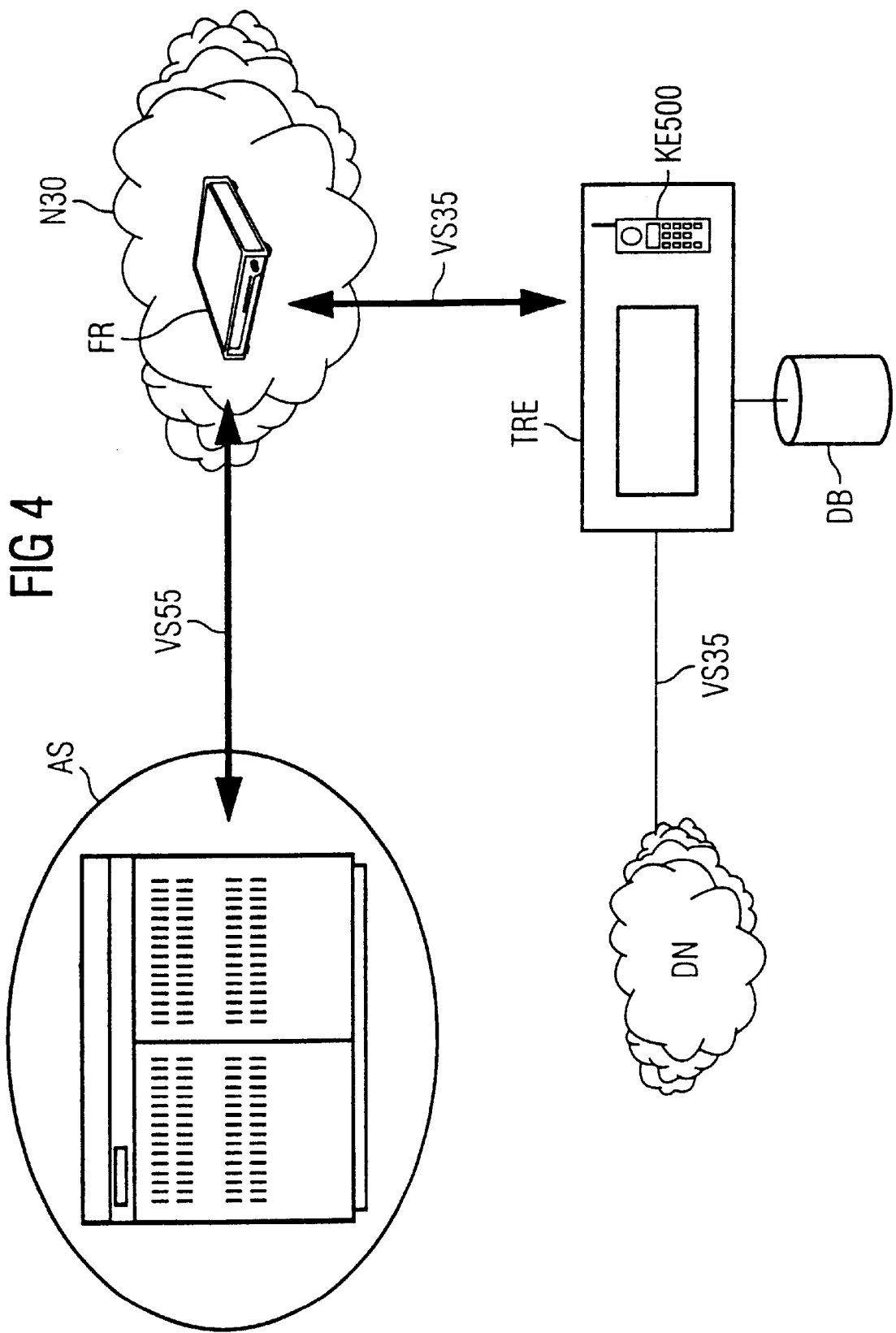

SYSTEM AND METHOD FOR REMOTE UPDATING OF A TELEPHONE NUMBER TRANSFORMATION DEFINITION

BACKGROUND OF THE INVENTION

Field of the Invention

Since the start of the process of liberalizing the market for providers of communication services, individual communication subscribers have had the opportunity to select the respective network operator freely. The customer accesses the various communication networks by dialing processes, by dialing code numbers that are applicable to the respective communication network. Owing to the large number of available providers and different charges at different times of day it is, however, virtually impossible for the individual customers to obtain an overview of the entire range of offers on the market and to select from this the best offer for his requirements at the respective time. On the basis of this unclear situation, providers have become established on the market who carry out the analysis of the market situation for the communication subscribers and, after payment of a fee, provide the subscriber with a device which automatically converts a number dialed by the subscriber into another number which corresponds to criteria which the subscriber has made available to the service provider in a requirement profile. Since the offers by network operators with regard to customer requirements are changing all the time, the service provider has to update the data in the terminal of the customer on a regular basis. This ensures that the communication subscriber is always provided with a communication link, corresponding to his communication requirements, via different communication networks by always entering the same number. One provider of such number transformation devices who has become established on the market is the company Telejet. The technical details of the method and device which are offered by this company, and which is also called a Least Cost Routing Box owing to the cost criterion for setting up a call (which criterion is frequently selected by the customer) are described on the Internet at the address "http://www.ico.de/tjtm.htm".

The disadvantages of the method described there are that the customer either has to initiate the updating data transfer by the transformation device on his own, or that this process is carried out via a time control process, which results in relatively long updating intervals. A further problem is that the telephone line of the customer is busy for the time it takes to transmit the data to the transformation device, and this incurs costs for the customer since the initialization of the transfer process starts from the transformation device.

SUMMARY OF THE INVENTION

It is accordingly an object of the invention to provide a system and a method for the remote updating of a telephone number transformation definition which overcomes the above-mentioned disadvantages of the prior art devices and methods of this general type, in which the telephone number transformation definition of a communication subscriber can be updated.

With the foregoing and other objects in view there is provided, in accordance with the invention, an improved method for the remote updating of a telephone number transformation definition in a transformation device by an updating point, the transformation device transforming at least one telephone number being dialed by a communication subscriber to a new telephone number defined by the telephone number transformation definition, the improvement which includes:
connecting the transformation device to the updating point; and
updating the telephone number transformation definition to a current definition.

The described method advantageously does not incur any costs for the customer, since the updating process is initialized by the updating point. Furthermore, the disadvantage of the line being busy is eliminated, since the updating can be carried out on the basis of statistical analysis by the updating point at a time at which, statistically, very little communication takes place on the line.

In a development of the described method, the definition is advantageously changed on a time-controlled basis, in which case the updating time can be agreed to from time to time between the two communication partners, that is to say the updating point and the transformation device. This ensures that the customer is inconvenienced as little as possible by the updating process.

In a further development of the described method, the activity of terminals which are connected to the transformation device is advantageously suppressed by the connecting line which leads to the transformation device being switched to mute mode shortly before the previously notified updating time, so that the customer is not inconvenienced by ringing or other device activities during the updating process.

In one development of the described method, the dialing behavior of the communication subscriber is statistically analyzed, in a particularly advantageous manner, by the updating point or the transformation unit, in order to be informed about the traffic occurring on the customer line. The updating of the definition is furthermore preferably carried out as a function of the change to a criterion that the customer has passed to the updating point in the form of a requirement profile. This is advantageously directly at a time at which a different situation arises with respect to a criterion relating to the network operator.

A system which is particularly advantageous has a communication terminal that contains means for variable definition of at least two telephone numbers and that is connected to an updating point which can update these telephone numbers remotely, with the definition of the telephone number transformation being initiated by the updating point. This results in a minimal configuration being provided, which achieves the object of the invention.with a low level of technical complexity.

In a development of the system, different communication networks or communication service providers can be accessed in a particularly advantageous manner by the different telephone numbers, and the change to the telephone number definition is carried out as a function of the change to a variable parameter of these networks or providers. This ensures that the communication subscriber is always provided with the most up-to-date data for the telephone number transformation.

In a development of the described system, the updating is carried out in a particularly advantageous manner only as a function of a criterion specified by the customer, so that the traffic which arises on the subscriber line as a result of the updating process can be minimized.

In a development of the described system, means for time control are particularly advantageously provided since, in this way, the updating point and the transformation device can be synchronized to one another for the data interchange.

In a development of the described method, means are advantageously provided to suppress the activities of customer terminals which are connected to a transformation device, in order that the customer is not inconvenienced by these activities during the updating process.

Other features which are considered as characteristic for the invention are set forth in the appended claims.

Although the invention is illustrated and described herein as embodied in a system and a method for the remote updating of a telephone number transformation definition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an example of a schedule/action plan, for wire-based updating; and

FIG. 4 is a topology for a wire-free system.

DESCRIPTION OF THE PREFERRED EMBODIMENTS

Figure 1:
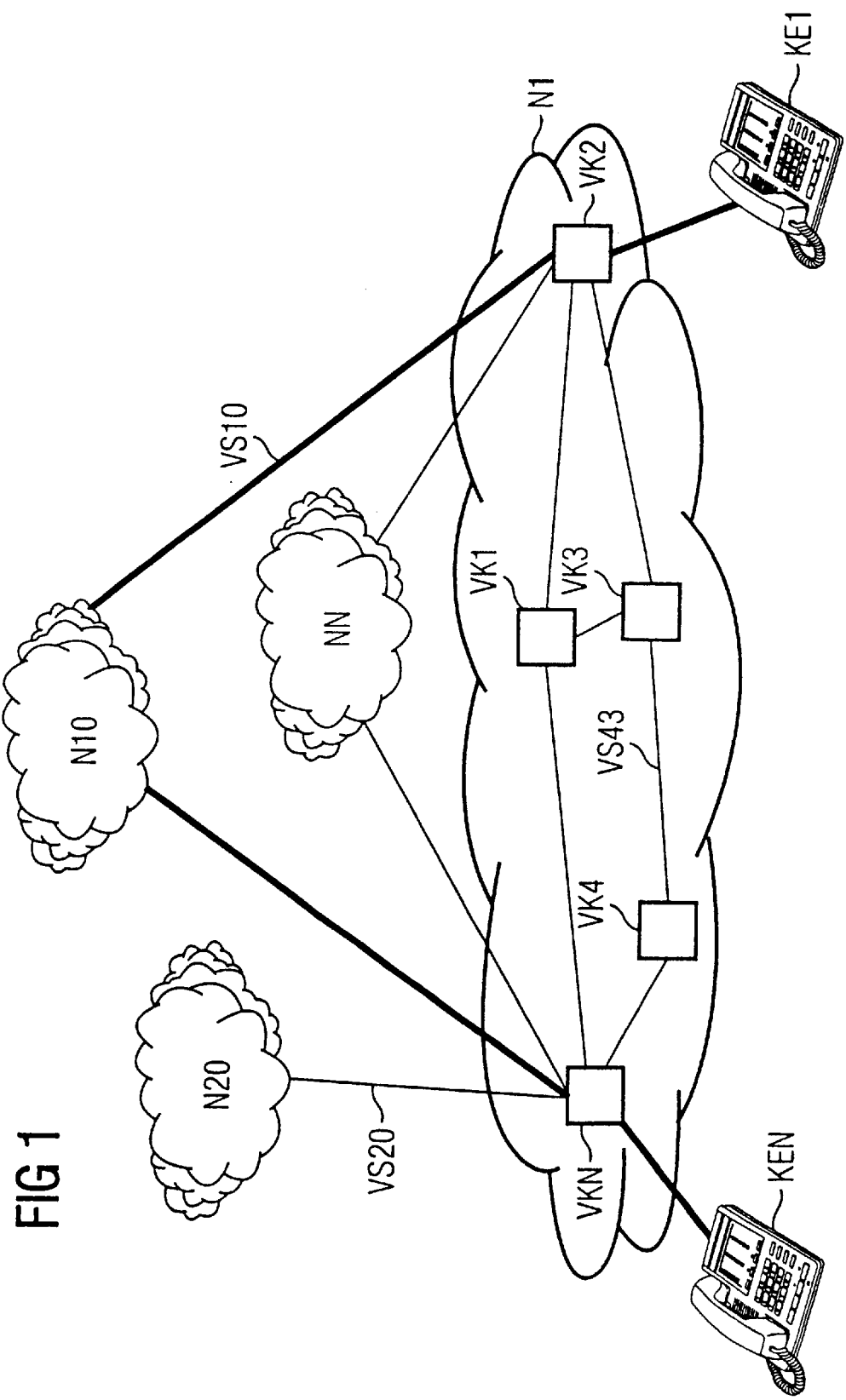
FIG. 1 is a diagrammatic topology of various communication networks.

In all the figures of the drawing, sub-features and integral parts that correspond to one another bear the same reference symbol in each case. Referring now to the figures of the drawings in detail and first, particularly, to FIG. 1 thereof, there is shown a network topology that contains communication terminals KE1 and KEN, as well as different communication networks N1, N10, N20 and NN. By way of example, switching nodes VK1 to VKN are illustrated for the communication network N1, and are connected to one another by connecting paths VS. Although the communication terminals KEN, KE1 illustrated here are telephones they may be any type of communication terminals without adversely affecting the invention. As can easily be seen from the illustration, there is a very wide range of options for accessing the communication terminal KEN via the various communication networks from the communication terminal KE1. With normal methods, the communication link and the corresponding network are selected by entering a network-specific telephone number. Selection criteria for dialing a specific network may be, for example, cost reasons or else technical reasons, such as availability of communication links at specific times, offers by various communication services, such as Video on Demand or Internet access, or different data transmission rates provided by the respective communication networks. Other criteria that are not enumerated here may also be significant to the customer.

Figure 2:
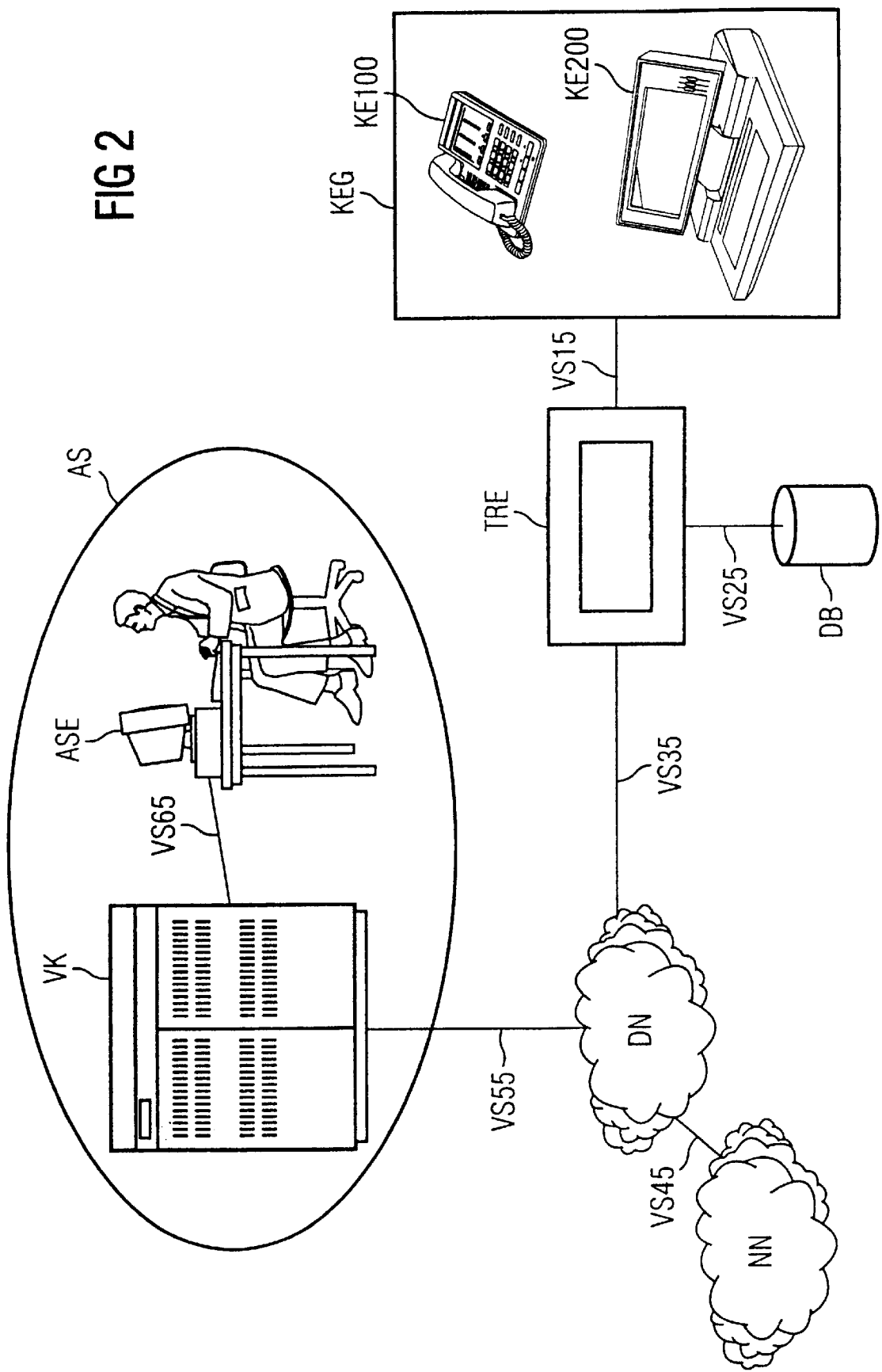
FIG. 2 is a topology of a system containing an updating point and a transformation device according to the invention.

As FIG. 2 shows, one example of a system containing an updating point AS which is connected, for example, to a switching node VK via a connecting path VS65, and which has an evaluation device ASE for evaluating communication-network-specific data for different communication networks. By way of example, the updating point AS is linked via a connecting path VS55 to a digital network DN, which is in turn connected via a connecting path VS35 to a transformation device TRE, which has a database DB with which it can communicate via a connecting path VS25. A communication terminal group KEG is connected to the transformation device TRE via a connecting path VS15 and in this case contains, for example, communication devices KE100 and KE200. However, a large number of devices that the customer has may be connected, and it is also unnecessary for the transformation device TRE to be configured separately with its own housing. In fact, the transformation device TRE can also be integrated in the communication terminal KEG at the premise of the customer. In this case, precautions must be taken to ensure that the procedures that take place during the updating process for the definition of the transformation numbers can be complied with. This applies in particular to those undesired activities of devices that could inconvenience the customer. The communication terminals KE can be used by the communication subscriber who has these devices to access any desired networks that are connected, for example, to the digital network DN via a connecting path VS45. For example, the database DB contains number transformation definitions which are appropriate for the corresponding customer and his terminal group KEG from the updating point AS in accordance with a requirement profile which is predetermined by the customer. These are selected, for example, on the basis of the criteria in the requirement profile which relate to parameters for different communication networks. The evaluation device ASE provides the updating point AS with the capability to evaluate any desired communication-relevant criteria for the large number of communication networks N and to map out these communication-relevant criteria onto the requirement profile of the customer in order to derive from the specific number transformations which are applicable to the respective customer, and to define the transformations. Depending on the technical equipment of the updating point AS, the evaluation process may be carried out manually or by electronic devices that may be provided, for example in the switching node VK. For example, it is also possible for the dialing behavior, which results from the dialing of numbers of different communication terminals in the communication terminal group KEG, to be stored in the transformation device TRE. The stored data can be called up by the updating point AS via the illustrated connecting paths, and a statistical analysis of the dialing behavior of a respective customer can be carried out in order to determine, for example, the traffic occurring on the connecting path VS35. The number transformation defined in the transformation device TRE may be influenced by the updating point AS at any time, via the illustrated links. In the case of an updating process which is initiated by the updating point AS, the communication terminals KE in the communication terminal group KEG are preferably deactivated, by the connecting path VS15 being decoupled. This prevents telephones from ringing, telephone answering machines from starting, fax machines feeding paper, or a PC being booted up in the expectation of electronic mail.

FIG. 3 shows an example of a schedule/action plan for the updating point AS to update the transformation device TRE. The updating point AS is shown on the left, while the transformation device TRE as well as the database DB that is present there are shown on the right, with the time axis t being plotted at the bottom. In this situation, it is important for the updating point AS and the transformation device TRE to have accurate clocks that are regularly set, or are controlled by a radio clock. For example, during the most recent updating process, the updating point AS determines the time A1 to be a suitable time for data transmission, and this was agreed, between the updating point AS and the transformation device TRE, as the data transmission time. Using the internal clock, the transformation device TRE recognizes that the time A1 is approaching and, at a time 500 which occurs at a time interval T10 before A1, the terminals at the premise of the subscriber are, for example, decoupled so that they do not carry out any undesired activities during the transmission. The transformation device TRE then continues to monitor whether the line is cleared again after a time interval T20 after A1, after which a call 1000 arrives from the updating point AS. This process is denoted by 2000. If the time interval T20 is not complied with, then the call 1000 did not originate from the updating point AS, and the subscriber terminals are released again, after a time interval T30 at a time 2200. Depending on the calling time A1, the transformation device TRE now waits, after a time interval T200, for a further call at a time A2. In an analogous manner to the procedure described above, the subscriber terminals are decoupled at a time 2500 by the updating point, at a time interval T10 before the expected call time, and, at 3000, the call from the updating point AS arrives, to transmit the new transformation data for the definition of the numbers which are applicable at the moment or will be in the future. This transmission protocol ensures that the updating point AS and the transformation device TRE can communicate via the subscriber access line, and that the subscriber is not inconvenienced by the updating process. This likewise ensures that the subscriber does not incur any costs whatsoever. 4000 denotes the data transmission process, with the arrow direction indicating that the data can be passed both from the updating point AS to the transformation device TRE and from the transformation device TRE to the updating point AS. This allows, for example, statistical dialing behavior data that are stored in the transformation device TRE to be called up by the updating point AS, and then to be statistically evaluated. As FIG. 4 shows, the updating point AS can also be connected to the transformation device TRE via a radio link, represented by VS55, N30 and VS35, as well as a radio repeater FR. The problem of the subscriber access line being busy during the updating process does not occur in this case, since this can take place in parallel with communication on the connecting path VS35 with the digital network DN by the communication terminal KE500. This illustration is also intended to show that the described system operates not only for wire-based networks, but also for wire-free networks. Thus, an application is likewise conceivable in which number transformations for wire-free network access to different radio networks are defined by the updating point AS.

We claim:

1. An improved method for remote updating of a telephone number transformation definition in a transformation device by an updating point, the transformation device transforming at least one telephone number being dialed by a communication subscriber to a new telephone number defined by the telephone number transformation definition, the improvement which comprises:

connecting the transformation device to the updating point;

updating the telephone number transformation definition to a current definition on a time-controlled basis;

controlling, via the current definition, access to various communication networks;

analyzing statistically a dialing behavior of the communication subscriber via the updating point;

carrying out and defining the current definition in dependence on at least one predetermined communication-network-specific criterion provided by the communications subscriber to the updating point;

monitoring, via the updating point, the various communication networks for the predetermined communications-network-specific criterion; and carrying out the remote updating of the telephone number transformation definition in dependence on a change in the predetermined communications-network-specific criterion.

2. A system for remote updating of a telephone number transformation definition for transformation of at least one telephone number dialed by a communication subscriber to a new telephone number defined by the telephone number transformation definition, the system comprising:

at least one transformation device variably defining at least two telephone number transformations;

one updating point for remote updating of at least one variable definition of said at least two telephone number transformations, the remote updating carried out by said updating point such that said updating point first contacts and connects to said at least one transformation device and then updates said at least one variable definition of said at least two telephone number transformations;

a same communication medium connecting said transformation device and said updating point;

means for updating the telephone number transformation definition to a current definition on a time-controlled basis; and means for starting a further updating attempt after a predetermined time interval known to both said updating point and said transformation device if a connection of the communication subscriber is busy at a previously notified updating time;

said at least two telephone number transformations connecting a communication terminal connected to said at least one transformation device to two different communication networks, and the remote updating of the at least one variable definition carried out in dependence on a change to at least one variable parameter of a respective communication network.

3. A system for remote updating of a telephone number transformation definition for transformation of at least one telephone number dialed by a communication subscriber to a new telephone number defined by the telephone number transformation definition, the system comprising:

at least one transformation device variably defining at least two telephone number transformations;

one updating point for remote updating of at least one variable definition of said at least two telephone number transformations, the remote updating carried out by said updating point such that said updating point first contacts and connects to said at least one transformation device and then updates said at least one variable definition of said at least two telephone number transformations;

a same communication medium connecting said transformation device and said updating point;

means for updating the telephone number transformation definition to a current definition on a time-controlled basis; and means for starting a further updating attempt after a predetermined time interval known to both said updating point and said transformation device if a connection of the communication subscriber is busy at a previously notified updating time;

the remote updating being carried out in dependence on at least one criterion dependent on at least one of the communication terminal and being subscriber specific.

4. The system according to claim 3, including:

a communication network that is common to said updating point and to the communication terminal and via which said remote updating is carried out; and a controller for controlling a timing of said remote updating.

5. The system according to claim 4, including means for deactivating a ringing signal at the communication terminal.

* * * * *